United States Patent
Demirci et al.

(10) Patent No.: US 12,432,466 B2
(45) Date of Patent: Sep. 30, 2025

(54) EVENT-DRIVEN INTEGRATED CIRCUIT HAVING INTERFACE SYSTEM

(71) Applicant: CHENGDU SYNSENSE TECHNOLOGY CO., LTD., Sichuan (CN)

(72) Inventors: Tugba Demirci, Sichuan (CN); Sadique Ul Ameen Sheik, Sichuan (CN); Ning Qiao, Sichuan (CN); Ole Juri Richter, Sichuan (CN)

(73) Assignee: CHENGDU SYNSENSE TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 18/010,486

(22) PCT Filed: Apr. 19, 2021

(86) PCT No.: PCT/CN2021/088143
§ 371 (c)(1),
(2) Date: Dec. 15, 2022

(87) PCT Pub. No.: WO2022/221994
PCT Pub. Date: Oct. 27, 2022

(65) Prior Publication Data
US 2024/0107187 A1    Mar. 28, 2024

(51) Int. Cl.
*H04N 25/47* (2023.01)
*H04N 25/79* (2023.01)

(52) U.S. Cl.
CPC .............. *H04N 25/47* (2023.01); *H04N 25/79* (2023.01)

(58) Field of Classification Search
CPC ........ H04N 25/47; H04N 25/79; H04N 25/57; H04N 25/703; H04N 25/707;
(Continued)

(56) References Cited

U.S. PATENT DOCUMENTS 11,490,092 B2    11/2022   Zhao et al.
2018/0262705 A1*  9/2018   Park ..................... H04N 25/79
(Continued)

FOREIGN PATENT DOCUMENTS

CN     107302695 A    10/2017
CN     112534816 A    3/2021
(Continued)

OTHER PUBLICATIONS

International Search Report and the Written Opinion Dated Jan. 25, 2022 From the International Searching Authority Re. Application No. PCT/CN2021/088143 and Its Translation of Search Report Into English (2 Pages).

*Primary Examiner* — Albert H Cutler
(74) *Attorney, Agent, or Firm* — Michael D. Eisenberg; MDE Patents (57) ABSTRACT

The present disclosure relates to an event-driven integrated circuit that includes a sensor, an interface system, and a processor. The interface module includes a copy module, a merge module, a sub-sampling module, an ROI module, and an event routing module. The modules constitute a programmable daisy chain. The sensor, interface system and processor are coupled to a single chip through an interposer or manufactured in a same die by different manufacturing processes. In contrast to prior art, the event-driven integrated circuit with lower chip occupied area and manufacturing cost can eliminate the signal loss and noise interference, and achieve high-speed signal processing, solving the technical problems of larger chip area and weak signal processing ability. The interface system enriches the functions and configurability of the interface system, and provides various advantages in power consumption, function, and speed for subsequent processing.

14 Claims, 4 Drawing Sheets

(58) Field of Classification Search
CPC .. G06F 15/7807; G06N 3/063; G06N 3/0464; G06N 3/049
See application file for complete search history.

(56) References Cited

U.S. PATENT DOCUMENTS

| | | |
|---|---|---|
| 2021/0105421 A1 | 4/2021 | Kukreja et al. |
| 2022/0030188 A1 | 1/2022 | Kurihara |
| 2023/0154135 A1* | 5/2023 | Nakagawa ............. H04N 25/47 382/103 |

FOREIGN PATENT DOCUMENTS

| | | |
|---|---|---|
| CN | 112597980 A | 4/2021 |
| CN | 112598700 A | 4/2021 |
| WO | 2020116416 A1 | 6/2020 |

* cited by examiner

EVENT-DRIVEN INTEGRATED CIRCUIT HAVING INTERFACE SYSTEM

This application is a US national phase application based upon an International Application No. PCT/CN2021/088143, filed on Apr. 19, 2021, entitled "EVENT-DRIVEN INTEGRATED CIRCUIT HAVING INTERFACE SYSTEM", the disclosure of which is incorporated herein by reference in its entirety.

FIELD OF THE DISCLOSURE

The present disclosure relates to an event-driven integrated circuit, and more particularly, to a low-power-consumption integrated circuit having an interface module that could asynchronously process events.

BACKGROUND

Event-driven sensors are known in the art. One kind of event driven sensors are event-driven cameras having a pixel array with pixels. A camera generates an event upon a change of illumination of a pixel. The event comprises an identifier of the change, e.g., −1 (darker) or +1 (brighter), and an event address that is indicative of the pixel that issued the event. Such cameras are also known as Dynamic vision sensors (DVS). In the art other event-driven sensors are known, such as one-dimensional sensors or sound sensors.

DVS are generating events in an asynchronous fashion and are event-driven and are thus not comparable to clock-based systems such as cameras that read out whole frames or lines of the pixel array. DVS provide for ultra-fast imaging while maintaining low data rates, as only changes are recorded.

However, downstream processing of the events requires a radically different processing architecture such as von-Neumann architecture operated with clock-based and synchronous-operating processors.

Designing a versatile processing architecture of event-driven systems is a challenging task, particularly with regard to the interconnection of the various preprocessing and processing components. In contrast to clock-based systems, event-driven systems have to be based on a different event processing flow, particularly involving AD-HOC handshake mechanisms between components when exchanging transmitting data. Such handshakes comprise essentially a request to exchange data, an acknowledging of said request and the subsequent exchange of data.

In event-driven systems, components, particularly sensors might have different specifications regarding pixel array size, hot-pixels, event addressing and so on. When assembling different components to a system, it is therefore a tedious, time-consuming, and expensive task to adapt the processing pipeline of the system. The term "processing pipeline" particularly refers to the wiring, i.e., the interconnection of the components, as well as to the data processing of the components and data transmission between the components. The term 'processing pipeline' particularly also refers to the specific fashion of how various output ports or variables of a first component of the system are connected to various input ports or variables of a second component of the system.

The design concept for an event-driving system is to seek the lowest power consumption for edge computing. In order to get the lowest power consumption, there were plenty of conventional art using different methods.

The "Science" magazine dated Aug. 8, 2014 introduce the IBM brain-inspired chip TrueNorth for the first time. The chip includes 5.4 billion transistors, 4096 neurosynaptic cores, 100 million programmable impulse neurons, 256 million configurable synapses. The chip adopts the event-driven design structure and is an asynchronous-synchronous mixed chip: the router, the scheduler, and the controller adopt a quasi-delay non-sensitive no clock asynchronous design. The impulse neurons adopt the traditional circuit with a synchronously clock. The clock is generated by the asynchronous controller. The frequency of the global clock is 1 KHz. If the video input has 400*240 pixels with a frame rate 30 frames per second, then the power consumption is 63 mW. Please refer to the document below for more information:

Prior Art 1: "A million spiking-neuron integrated circuit with a scalable communication network and interface", Paul A. Merolla, John V. Arthur et al, Vol. 345, Issue 6197, SCIENCE, 8 Aug. 2014.

Figure 11:
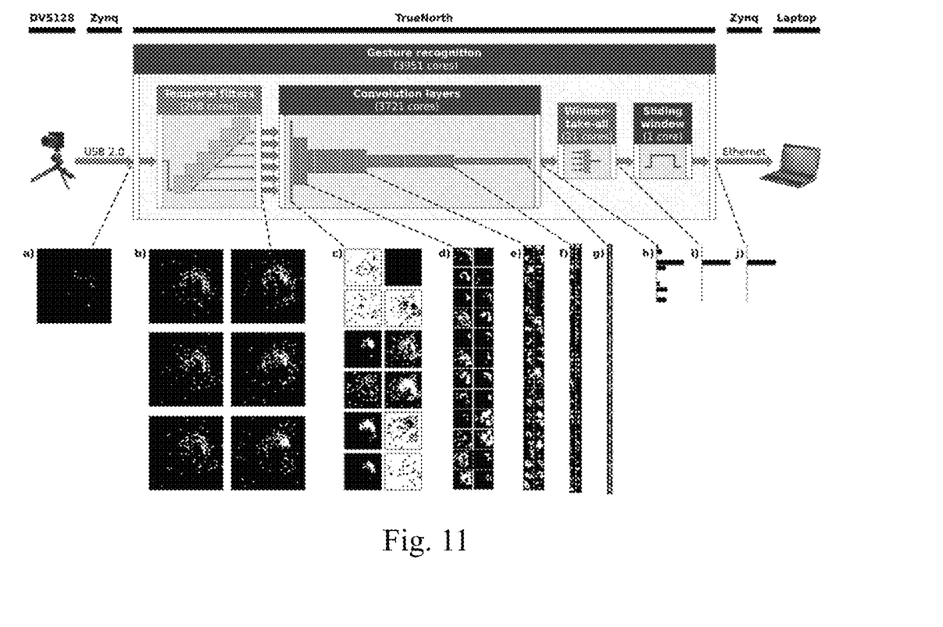
FIG. 11 is a gesture identification system based on the conventional IBM TrueNorth chip.

The CVPR held on Jul. 21-26, 2017 disclosed a gesture identification system based on the IBM TrueNorth chip: please refer to FIG. 1 and FIG. 4 of the article (or FIG. 11 of this application, the detail of this Figure could be referred to the article and thus illustrations are omitted here). The TrueNorth processor on the NSIe development board receives the event outputted from DVS 128 through the USB 2.0 interface. In other words, DVS and the processor are connected through the USB cable. Please refer to the document below for more information:

Prior Art 2: "A Low Power, Fully Event-Based Gesture Recognition System", Arnon Amir, Brian Taba et al, 2017 IEEE Conference on Computer Vision and Pattern Recognition (CVPR), 21-26 Jul. 2017.

In November, 2017, Intel disclosed its brain-inspired chip named as Loihi. From its symposium, it reveals that the power consumption of the chip is 74 mW. The neuromorphic computing development in Intel's official website indicated: Loihi hardware could be used in those fields where the INRC members need to directly access the hardware (such as robot research). These systems include a USB form factor having a codename "Kapoho Bay". Kapoho Bay provides the USB interface for Loihi and further includes an event-driven interface of a DAVIS 240C DVS silicon retinal camera from iniVation. In other words, for Loihi, it also connects to another component through the USB and DVS interface. Please refer to the document below for more information (also accessible from the website of Internet Archive):

https://newsroom.intel.com/news/intel-announces-neuromorphic-computing-research-collaborators/#gs.vj5gmb, 6 Dec. 2018

The "Nature" magazine dated Aug. 1, 2019 reported, in its cover article, a brain-inspired chip Tianjic developed by Tsinghua University. When a typical voltage level 0.9V is applied, the power consumption is 400 mW (it's 950 mW when the voltage is 1.2V). In other articles, it disclosed more technical details of Tianjic. The article disclosed: the single chip PCB is equipped with Altera Cyclone 4 FPGA and communication interfaces USB and SPI. Please refer to FIG. 2b, the camera is connected to the FPGA through the USB interface and finally connected to Tianjic. In other words, in this publication, the optical sensor and the processor could also be connected through USB interface. Please refer to the document below for more information:

Prior Art 3: "A hybrid and scalable brain-inspired robotic platform", Zhe Zou, Rong Zhao et al, Scientific Reports, 23 Oct. 2020.

The above are some examples from the top event-driven system designers. Compared to the traditional Von Neumann architecture CPU having 100-200 W power consumption, these systems have better power consumption and performances. In order to connect to the sensor and AI processor, the above techniques use USB cable/interface or other interface technique. These top event-driven system designers do not acknowledge any disadvantages of them.

However, the inventor recognizes: in the above conventional art, the USB cable (or other cables) has a certain length so the system may encounter the signal loss or noises coupling to the cable. In addition, because of the cable, the handshake (such as the initial communication before/after data transmission) between equipments will consume more power and slow down the processing speed. This may have bad impacts on the performance of the brain-inspired chips. In the conventional art, these top designers focused on the power consumption and believe their solutions have satisfied all needs in the specification without noticing the above factor. Therefore, without other clear indication, these top designers lack of any knowledge/motivation to further improve their solutions.

In addition, the inventor has another discovery when the inventor was trying to do related research or provide some solutions. For DVS, to have a better image quality, a specific semiconductor manufacturing process needs to be used to manufacture DVS, such as CIS-CMOS image sensor. However, for the AI processor (such as the after mentioned sCNN processor), if the regular CMOS manufacturing process is adopted, the regular CMOS manufacturing process is not good enough to manufacture the high-quality image sensor (because image formation quality is not good enough). However, if the CIS-CMOS manufacturing process is used to manufacture the sensor and AI processor, the AI processor will occupy a huge chip area and increase the chip cost especially when the sensor and AI processor are on the same chip/die. Since the market tends to have a smaller chip size, this reduces the chip's market competitiveness. Therefore, how to reduce the signal loss and noises as well as to reduce the cost and the chip size becomes a new issue for the mass production of the brain-inspired chip.

Unlike the traditional Von Neumann architecture, the process from event generation to event is related to the event transmission. This process could be regarded as an interface system. The design for this interface system will be a new technical challenge. For example, the challenge would be how to design a system that could complete the event transmission with a high efficiency, a high flexibility, and a low power consumption.

The present disclosure is to deal with one or a combination of the above-mentioned issues. The present disclosure could solve or alleviate one or a combination of the above-mentioned issues.

Please note, the above-mentioned techniques might be completely or partially publicly available unless the source is disclosed. In other words, the applicant never concedes that all the mentioned techniques must be the prior art according to the patent law unless there are substantial evidences. Furthermore, the above-mentioned disclosure of techniques and features of the related art will be published along with the publication of this application.

SUMMARY

One objective of an embodiment of the present disclosure is to provide an integrated circuit to solve or alleviate one or a combination of the above-mentioned issues.

According to an embodiment of the present disclosure, an integrated circuit is disclosed. The integrated circuit comprises an event-driven sensor (10), an event-driven interface system (20) and an event-driven processor (30). The event-driven sensor 10, the event-driven interface system (20) and the event-driven processor (30) are coupled to the single chip (3).

In some embodiments, the event-driven sensor (10) is configured to: after an input device (11) of the event-driven sensor (10) detects an event generation signal and/or a change of the event generation signal, asynchronously generate and output an event (100), wherein the event (100) comprises an event address is correlated to or comprises an event address of the input device (11), an output end of the event-driven sensor (10) is coupled to an input end of the event-driven interface system (20).

The event-driven interface system (20) is configured to: asynchronously receive the event(s) (100) and preprocess the received event(s) (100), an output end of the event-driven interface system (20) is coupled to an input end of the event-driven processor (30).

The event-driven processor (30) is configured to: receive the preprocessed event(s) (101) from the event-driven interface system (20) and asynchronously process the preprocessed event(s) (101).

The event-driven sensor (10), the event-driven interface system (20) and the event-driven processor (30) are coupled to the single chip (3) through an interposer (40).

In some embodiments, the event-driven interface system (20) and the event-driven processor (30) are both located in a first die (1-1); or the event-driven sensor (10) and the event-driven interface system (20) are both located in a second die (1-2); or a part of the event-driven interface system (20) and the event-driven processor (30) are both located in the first die (1-1) and the other part of the event-driven interface system (20) and the event-driven sensor (10) are located in the second die (1-2).

In some embodiments, the event-driven interface system (20) and the event-driven processor (30) are both located in a first die (1-1); and the second die (1-2) where the event-driven sensor (10) is located is stacked on the first die (1-1).

In some embodiments, the interposer (40) is a silicon interposer or a glass interposer.

In some embodiments, the event-driven sensor (10), the event-driven interface system (20) and the event-driven processor (30) are packaged on the single chip (3) through a 2.5D or 3D packaging technique.

In some embodiments, the event-driven sensor (10) is a combination of one of more of the following types of sensors: a point sensor, an 1D sensor, a 2D sensor and a 3D sensor.

In some embodiments, the event-driven sensor (10) is a combination of one of more of the following types of sensors: a sound/vibration sensor and a dynamic vision sensor.

In some embodiments, the event-driven processor (30) comprises a spiking neural network.

In some embodiments, the event-driven processor (30) comprises a spiking convolutional neural network.

In some embodiments, the first die and the second die are manufactured by different technology nodes.

In some embodiments, the event-driven interface system (20) comprises at least one interface module (200) that constitutes a programmable daisy chain and asynchronously processes the event(s) (100) received from the event-driven sensor (10).

In some embodiments, the interface module (200) comprises a copy module (201), the copy module is configured to: receive events (100), perform copy operation to obtain copied events (100c), transfer the copied events (100c) to an external processing pipeline and transfer the events (100) through the programmable daisy chain. The events (100) are from the event-driven sensor (10) or another interface module (200), i.e., a merge module, of the event-driven interface system (20).

In some embodiments, at least one interface module (200) comprises a merge module (202), the merge module (202) is configured to: receive events (100, 100e) from at least two different sources and transfer a part or all of the events (100, 100e) to the downstream interface module (200) through the programmable daisy chain. The events (100) are from the event-driven sensor (10) or another interface module (200) of the event-driven interface system (20), i.e., a copy module. The events (100e) are also from the integrated circuit, a part/module from another integrated circuit or another event-driven sensor.

In some embodiments, the at least one interface module (200) comprises a sub-sampling module (203) which is configured to assign a single address to the received events (100).

In some embodiments, the sub-sampling module (203) comprises a division module (203-4), configured to route the event(s) (100) to a correlated scaling register of sub-sampling module (203) according to the address of the received event(s) (100); the scaling register is configured to divide, sub-sample, pool, and/or shift the received address and output the address to an address reassemble module (203-5) of the sub-sampling module (203); wherein the address reassemble module (203-5) is configured to adjust the event address according to a scaled address and forward the event(s) with the adjusted address through the programmable daisy chain.

In some embodiments, the at least one interface module (200) comprises a region of interest (ROI) module (204), configured to adjust a property of at least one event address and/or to discard events (100) having properties outside of a range of programmable event address properties and transfer the non-discarded events (100) through the programmable daisy chain. The ROI module adjusts the event address by one or combination of shifting, flipping, swapping and/or rotating the property of the at least one event address.

In some embodiments, the at least one interface module (200) comprises an event routing module (205), configured to receive the event(s) (100), add a header information to the received event(s) (100), and output the event(s) 100 along with the header information to the event-driven processor (30) and/or another event-driven processor or another processing pipeline.

In some embodiments, at least one interface module (200) comprises a rate limit module, configured to forward a part of the events (100) through the programmable daisy chain when the rate of the events (100) is greater than a maximum rate to limit the rate of the events not to be greater than the maximum rate.

In some embodiments, the at least one interface module (200) comprises a mapping module (206), configured to map an event address to another event address.

In some embodiments, the mapping module (206) comprises one or a combination of an ROI module, a look up table module, a flipping and/or rotating module. The flipping and/or rotating module is configured to flip and/or rotate the event address of the event (100).

In some embodiments, the at least one interface module (200) comprises an event address rewrite module (207), configured to convert the event address into a common address format such that events with the common address format are transferred through the programmable daisy chain.

In some embodiments, the at least one interface module (200) comprises an event address filter module (208), configured to filter out a series of events (100) having a preselected event address.

In some embodiments, the event address filter module (208) is a hot pixel filter module (208'), configured to filter out the certain events having a specific event address and use a CAM storage device (208'-3) to store an event address list to be filtered.

In some embodiments, one or more interface modules (200) of the event-driven interface system (20) can be bypassed by a programmable switch.

According to a second aspect of the present disclosure, an event-driven interface system (20), coupled to an event-driven sensor (10) and an event-driven processor (30) is provided. The event-driven interface system (20), the event-driven sensor (10) and the event-driven processor (30) are integrated as an integrated circuit. The event-driven sensor (10) generates and asynchronously outputs events (100). Each one of the events (100) comprise an event address is correlated to or comprises an event address of the input device (11) of the event-driven sensor (10). The event-driven interface system (20) comprises at least one interface module (200), the interface module (200) constitutes a programmable daisy chain and asynchronously processes the event(s) (100) received from the event-driven sensor (10).

In some embodiments, the at least one interface module (200) comprises one or more the following modules: copy module (201), merge module (202), sub-sampling module (203), ROI module (204) and event routing module (205). The copy module (201) is configured to: receive events (100), perform a copy operation to obtain a copied event (100c) and transfer the copied events (100c) to an external processing pipeline, transfer the event (100) through the programmable daisy chain. The events (100) are from the event-driven sensor (10) or another interface module (200) of the event-driven interface system (20). The merge module (202) is configured to receive events (100, 100e) from two different sources at least, and transfer a part or all of the events (100, 100e) to the downstream interface module (200) through the programmable daisy chain, wherein the events (100) are from the event-driven sensor (10) or another interface module (200) of the event-driven interface system (20), and the events (100e) are also from the integrated circuit, a part/module from another integrated circuit or another event-driven sensor. The sub-sampling module (203) is configured to assign a single address to its received events (100). The region of interest (ROI) module (204) is configured to adjust a property of at least one event address and/or to discard events (100) having properties outside of a range of programmable event address properties and transfer the non-discarded events (100) through the programmable daisy chain; wherein the ROI module adjusts the event address by one or combination of shifting, flipping, swapping and/or rotating the property of the at least one event address. The event routing module (205) is configured to receive event(s) (100), add header information to the received event(s) (100), and output the event(s) (100) along with the header information to the event-driven processor (30) and/or another event-driven processor or another processing pipeline.

In some embodiments, at least one interface module (200) has the following coupling order along the events transmission direction of the programmable daisy chain: the copy module (201), the merge module (202), the sub-sampling module (203), the region of interest (ROI) module (204), and the event routing module (205); or the merge module (202), the copy module (201), the sub-sampling module (203), the region of interest (ROI) module (204), and the event routing module (205).

In some embodiments, for the copy module (201), the events (100) are from the merge module (202) under the name of the forementioned another interface module (200) of the event-driven interface system (20); and/or for the merge module (202), the events (100) are from the copy module (201) under the name of the forementioned another interface module (200) of the event-driven interface system (20).

In some embodiments, an event address rewrite module (207) and/or an event address filter module (208) upstream coupled the coupling order, wherein the event address rewrite module (207) is configured to convert the event address into a common address format such that the events with the common address format are transferred through the programmable daisy chain and the event address filter module (208) is configured to filter out a series of events (100) having a preselected event address.

In some embodiments, the event (100) is processed by the event address rewrite module (207) first and then processed by the event address filter module (208).

In some embodiments, the event address filter module (208) is a hot pixel filter module (208'), configured to filter out the certain events having a specific event address and use a CAM storage device (208'-3) to store an event address list to be filtered.

In some embodiments, at least one interface module (200) comprises a mapping module (206), wherein the mapping module (206) comprises one or a combination of an ROI module, a look up table module, a flipping and/or rotating module; wherein the flipping and/or rotating module is configured to flip and/or rotate the event address of the event (100).

In some embodiments, at least one interface module (200) comprises a rate limit module configured to forward a part of the events (100) through the programmable daisy chain when the rate of the events (100) is greater than a maximum rate to limit the rate of the events not to be greater than the maximum rate.

In some embodiments, at least one interface module (200) of the event-driven interface system (20) can be bypassed by a programmable switch.

In some embodiments, the event-driven sensor (10), the event-driven interface system (20) and the event-driven processor (30) are coupled to a single chip (3) through an interposer (40) or manufactured in a same die.

In contrast to the conventional art, the present disclosure has, but not limited to, the following advantages:
1. Providing an integrated solution having a sensor, an interface, and an event-driven processor, which could reduce the signal loss and noises and have a smaller chip size and a low cost such that this solution could achieve sub-mW power consumption.
2. Providing an event-driving interface system, which could complete the event transmission with a high efficiency, a high flexibility, and a low power consumption and provide an event pre-processing function such that a processor could efficiently and easily processes the event.

The above-mentioned techniques, technical features, and technical means might not be completely the same as those in parts of the following embodiments. However, these techniques also fall within the scope of the present disclosure. These techniques, technical features, and technical means and those disclosed in the following embodiments could be reasonably combined to accomplish more techniques, which could be regarded as beneficial supplements of the embodiments. Similarly, some details in the figures in this disclosure might not be illustrated in detail. But if one having ordinary skills in the art could infer the techniques from the related disclosure, corresponding descriptions, common knowledge in this field, or other conventional techniques (such as conferences or papers), then these details also fall within the scope of the present disclosure. In addition, these details could be also used to combine with other techniques to obtain new techniques. The techniques generated by combining technical features disclosed in the present disclosure could be used to support the summary of the techniques, the amendments, the claims or the disclosure of this patent application.

DETAILED DESCRIPTION

1. Statements for the Description in the Following Disclosure

In order to clearly describe and illustrate the techniques disclosed in the present disclosure, in the following disclosure, it should be noted:

Descriptions regarding an embodiment, even if these descriptions are corresponding to the same figure or the same area, are not limited to any specific embodiment. Instead, these descriptions could be optional descriptions for potential embodiments having specific technical features. The embodiments should be understood as all reasonable combinations of technical features disclosed in the following disclosure as long as these combinations are not meaningless or contradictory. Therefore, an embodiment in the following disclosure may not include a specific technical feature.

Embodiments of the methods and the devices may independently describe some technical features. Normally, this means that other types of embodiments also have corresponding technical features or the devices/steps corresponding to the technical features. The difference is merely that these technical features and corresponding steps/devices are not entirely described. For example, a method embodiment could imply that a device embodiment comprises a corresponding device/module/component for implementing a step/instruction/function of the method embodiment. Similarly, the device embodiment could imply that a corresponding step/instruction/function of the method embodiment executed by a device/module/component of the device embodiment. These implied features could be also used to support the summary of the techniques, the amendments, the claims or the disclosure of this patent application.

In the present disclosure, those words in the parentheses should be regarded as a supplemental explanation of the non-English term beside them to assist the reader to understand a certain term in English in the related field. When the non-English term cannot be correctly understood or there is contradictory, the English words could be used to assist the reader to understand the meaning of the term and could be taken as the right meaning if it's necessary. In addition, not all the same non-English terms are explained by the above way. So, if a non-English term is explained by the corresponding English term parentheses, this corresponding English term could be used to explain the same non-English terms appearing in other places.

In the present disclosure, a specific term might be given a specific meaning. This specific meaning could be used to explain the same term in the claims in this application or another related document.

The terms "module", "component", "some part", and "system" used hereinafter, refer to a product or part of a product that is implemented only by hardware, only by a combination of software, software, and hardware. Unless there is a clear contextual indication, the present disclosure does not imply that the aforementioned terms can only be implemented by hardware or software.

In the present disclosure, "A, B, C" means A or B or C. "A, B or C" means A or B or C. "A, B and C" means A and B and C.

In addition, if the term "and/or" is used, it means all combinations. For example, "A and/or B" or "A or/and B" means three possible combinations (1) A; (2) A and B; and (3) B.

In addition, "/" means the logic "or" if this "/" is not used in a mathematic equation.

In the present disclosure, "the first XX module input end" is the same as "XX module first input end." These terms both indicate the same component unless "XX module" itself is not clear enough to indicate the component or introduce a confusion. In this case, the term "XX module" should be interpreted by a broadest reasonable interpretation.

In addition, the term "may, may be, might" means "optional" unless it is used to represent a capability. This is used to illustrate a preferred embodiment and imply there is a potential alternative. In addition, the term "about, around, close to" means that an error is permitted as long as the technical issue could still be alleviated. This does not mean that the number/data should comply with a normal mathematical meaning when it's strictly measured (because there is nothing that could exactly meet the number in the mathematical meaning). These terms do not introduce any ambiguities for the POSITA (person of ordinary skill in the art) to understand the scope of the present disclosure. In fact, how to determine whether a specific number/technical feature falls within the scope of the claims should depend on whether the specific number/technical feature could solve the technical issues.

In the present disclosure, regarding the same component, the terms might be different. The reasons why are because the term might be described in an abbreviated form or an insertion of an auxiliary word. In the context, if there is no clear alternative meaning, the two terms could be pointed to the same component.

The description "B corresponding to A" represents that B is related to A or that B could be determined according to A. However, it should be understood that this does not mean that B is determined only according to A. In fact, B could be determined according to A and/or another information.

The terms "first" and "second" are used to identify or distinguish two components but are not used to limit the number of the components. Although it is often used to point to one component but this does not mean that the number of the component should be limited to one. For example, only one component is shown because of equivalent alternative, better performance, or pressure sharing.

Even if a benefit is not described in the previous disclosure, the benefit might be disclosed in a specific embodiment. It should be understood that the benefit is obtained by the inventor's inventiveness.

The figures in the present disclosure are depicted for better illustrating this application. Therefore, the figures might not be able to depict the techniques in its entirety. The size, number or comparative ratio shown in the figures might not be the 100% correct actual product. Furthermore, those not shown in the figures might be still included in the present disclosure. Therefore, the details of the figures should not become any limitations of the present disclosure.

The legislation of the patent system does not require an applicant to describe his invention in all possible details. Although the applicant already tried his best to disclose the technical details as many as possible, it is not possible for anyone to disclose unlimited details in unlimited deepness. For those techniques/objective/technical means not illustrated in too many spaces, those techniques/objective/technical means are not those the applicant wants to implement but cannot implement. In fact, even if the conventional art does not provide the perfect solution, the applicant believes a person having ordinary skills in the art may obtain/combine/dig out/experiment a certain solution based on the teaching of the present disclosure, his knowledge, patents, papers, books, technical specifications, internet documents, etc.

Specifically, the terminologies in the embodiments of the present disclosure are merely for describing the purpose of the certain embodiment, but not to limit the disclosure. Examples and the appended claims be implemented in the present disclosure requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

2. Description of the Techniques

This application is related to an event-driven integrated circuit system. Therefore, the sensors, interface systems, and processors are all event-driven. In the present disclosure, the terms "integrated circuit system" and "integrated circuit" substantially have the same meaning, the terms "interface system" and "interface circuit" substantially have the same meaning. The term "system" has a meaning of a product property. The term "couple" represents those two or more components are "electrically connected."

Figure 1:
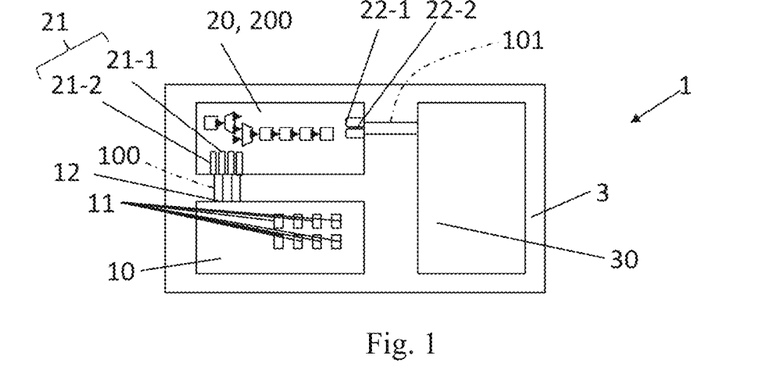
FIG. 1 is a diagram of an event-driven circuit system according to an embodiment of the present disclosure.

Please refer to FIG. 1. FIG. 1 depicts a layout of an integrated circuit according to an embodiment of the present disclosure. The event-driven integrated circuit system 1 comprises an event-driven sensor 10 (hereinafter, the sensor 10), an event-driven interface system 20 (hereinafter, the interface system 20) and an event-driven processor 30 (hereinafter, the processor 30).

It should be noted that the event-driven sensor 10, the event-driven interface system 20 and the event-driven processor 30 are defined and divided by their respective functions. This means these components are not necessary to be physically independent. In the actual implementation, they could be implemented by three independent components or could be integrated/combined as a single component that could achieve multiple functions. For example, the sensor 10 and the interface system 20 could be integrated (especially in a die). Or, the interface system 20 and the processor 30 could be integrated. It is possible that the combination may decrease a certain performance but the present disclosure does not limit any combination of these three components.

To solve the signal loss, noise interference and transmission delay caused by the USB cable, and pursue more extreme low power consumption, in some embodiments of the present disclosure, the event-driven sensor 10, event-driven interface system 20, event-driven processor 30 are integrated within a single chip (not shown in FIG. 1). In some embodiments, the event-driven sensor 10, event-driven interface system 20, event-driven processor 30 are integrated on a single die. At this time, the sensor 10 and the processor 30 are made by the same manufacturing process, such as a conventional 65 nm CMOS process, but this sub-optimal solution is at the expense of the image quality of the sensor 10.

In some embodiments, the sensor 10, the interface system 20, and the processor 30 are coupled to a single chip (two or more dies) through an interposer (not illustrated in figure). The interposer includes but not limited to a silicon interposer or a glass interposer. The present invention does not limit the material type of the interposer.

In the present disclosure, the term "single chip" indicates one or more dies coupled by the interposer, or only one die but no interposer is required. It should be noted that in some cases, the context of the term may imply/restrict the term to only represent one of the above meanings.

In some embodiments, the event-driven sensor 10 is an event-driven 2D sensor (such as an event-driven camera). The sensor 10 normally comprises one or more event-driven input devices 11. For example, the event-driven camera comprises numerous pixels and each of the pixels is one event-driven input device 11. The input devices 11 of the event-driven sensor 10 are configured to asynchronously generate an event after detecting an event-triggered signal or/and a change of the event-triggered signals (such as the changes of the luminance of the pixels). Here, each event is correlated or comprises an event address. The address comprises/indicates an identifier of the input devices 11. For example, each of the pixels in a 2D matrix has its X and Y coordinates.

In some embodiments, the event-driven sensor is a 1D, 2D, 3D or other type of sensor.

About the design of the event-driven 2D matrix sensor, it could be referred to a reference (European patent: Photoarray for detecting time-dependent image data. Published: Jun. 27, 2018).

Prior art 4: EP1958433B1

The present disclosure incorporates the prior art 4 and the detailed explanation of this patent is omitted for simplicity. However, the implementation of the sensor is not limited.

In some embodiments, the output end 12 of the sensor 10 is coupled to the input end 21 of the interface system 20. The sensor 10 outputs the event(s) 100 in an asynchronous way. The interface system 20 could perform a common processing on each of the events regardless of the characteristics of the sensor 10, after various performing pre-processes on each of the events. Specifically, the interface system 20 could comprise a series of interface modules 200 and each interface module 200 could be configured to process the incoming events 100 in a programmable way. In this way, according to the common event address structure and the possibly existed event header, the event processed by the processor 30 has the same format. Furthermore, in some embodiments, the interface module 200 could be configured to perform (1) filtering step; and/or (2) address manipulating step, in order, for example, to limit the incident event rate within the processing capability of the processor 30 and/or to provide a predetermined event address format. Each of the above operations could effectively reduce the power consumption of the event-driven integrated circuit system 1.

For parallel signal processing, the interface system 20 comprises a series of/multiple parallel input ends 21 (such as 21-1 and 21-2) for receiving events 100 from the sensor 10. The interface system 20 further comprises a series of/multiple parallel output ends 22 (such as 22-1 and 22-2) coupled to the input end of the processor 30. The output ends 22 are configured to transfer the preprocessed events 101 in parallel to the processor 30. The configuration allows multiple events to be simultaneously transferred and thus achieves power consumption reduction and fast event processing.

Figure 2:
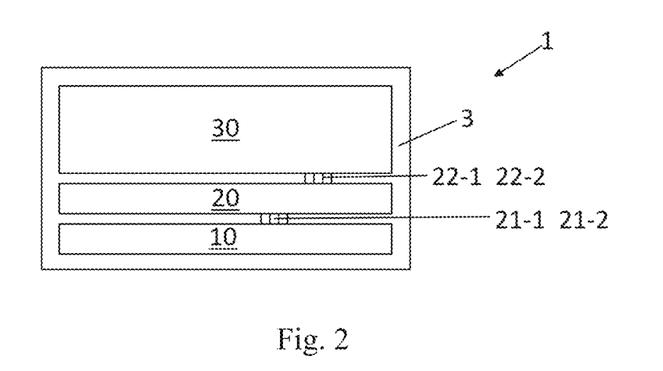
FIG. 2 is a diagram of a circuit system according to another embodiment of the present disclosure.

FIG. 2 illustrates an alternative embodiment. In this embodiment, the event-driven sensor 10 is a 1D event-driven sensor, such as an event-driven mechanical pressure sensor for sensing mechanical vibration. Similarly, the sensor 10, the interface system 20 and the processor 30 are integrated on the single chip 3 and coupled to each other through the interposer 40.

In some embodiments, the processor 10, the interface system 20 and the processor 30 are coupled at the same side of the chip 3. In some other embodiments, the processor 10, the interface system 20 and the processor 30 are coupled at two sides of the chip 3. The present disclosure does not limit the side where the three components are located.

In some embodiments, the sensor 10 and the interface system 20 are integrated on the same die. In another embodiment, the interface system 20 and the processor 30 are integrated on the same die.

In addition, the sensor 10 could be a point sensor. In this case, the event address of the point sensor is the same address. For a sound sensor, in some embodiments, the sensor 10 could comprise two sound sensors at different physical locations to achieve stereo sound collection.

In contrast to the conventional circuit system, which is not event-driven or not on the same chip 3, the design of the pressure sensor could enormously reduce the power consumption and could be operated asynchronously. This is more beneficial in a case that the system is supplied by a battery and requires a long working time.

The cooperation of multiple event-driven components on a single chip 3 could make the circuit system 1 have an extremely low energy footprint. This permits a high-speed operation. These operations could be characteristic detection and classification methods. For these purposes, the processor 30 is configured as an event-driven spiking artificial neural network (or simplified as event-driven spiking neural network, SNN). SNN includes multiple network algorithms. Preferably, the CNN could be configured as an event-driven spiking convolutional neural network (sCNN). This kind of network is especially a fit for super fast application, such as an object identification.

The implementation of the sCNN could be referred to PCT patent application: Event-driven spiking convolutional neural network, which is published on 15 Oct. 2020.
Prior art 5: WO 2020/207982A1.

The present disclosure incorporates the prior art 5 and the detailed explanation of this patent is omitted for simplicity. However, the implementation of the sCNN is not limited. The present disclosure does not exclude any implementation of heterogeneous integrated network that combines the SNN+ANN.

The event-driven processor 30 configured as the event-driven spiking neural network, which is integrated with geometry structure of the integrated circuit. This could further achieve the needs for long working time period and low power consumption.

Such integrated circuit system could achieve the purpose of only outputting related information of the detected object, such as "table," "chair," " . . . approaching." In contrast to the conventional art, the present disclosure does not need to record or upload a lot of data and thus could reduce the time for transmitting the information to the cloud, the processing resources, and the power consumption. Therefore, it could be used in an application of low power consumption, low delay, low data storage requirement, and long working time period, such as IoT or edge calculating field. In some embodiments, 64*64 DVS manufactured by a 65 nm technology node could have an average power consumption of 0.1 mW and a peak power consumption of 1 mW. 128*128 DVS could have an average power consumption of 0.3 mW and a peak power consumption of 3 mW.

In some embodiments, the processor 30 comprises at least two processors. Particularly, the processors are configured to execute different tasks. Furthermore, the processor 30 is configured to asynchronously process events.

Figure 3:
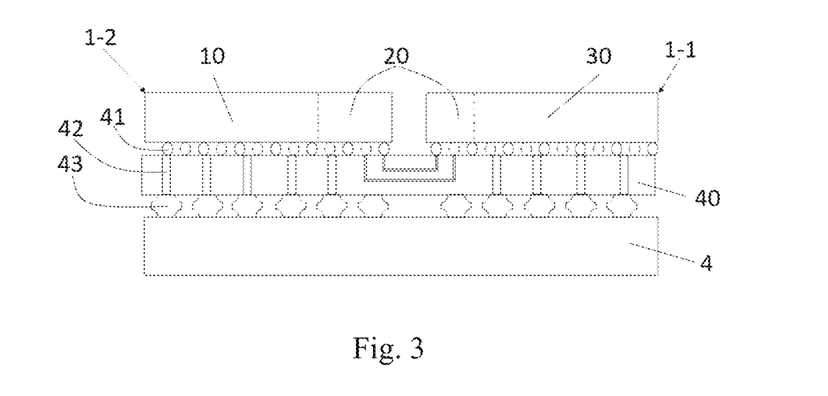
FIG. 3 is a diagram of a cross-section of a chip according to an embodiment of the present disclosure.

Please refer to FIG. 3. FIG. 3 illustrates a cross section of a chip according to an embodiment of the present disclosure. The package substrate 4, for example, could be connected to the interposer 40 through the C4 bumps 43. The interposer 40 has some vias 42 and some μ bumps 41. Two dies, the first die (which could be called as first integrated circuit) 1-1 and the second die (which could be called as second integrated circuit) 1-2, are placed on the μ bumps 41. According to the configuration of the interposer 40, the first die 1-1 could be coupled to the second die 1-2 through the μ bumps 41, the vias 42 and some other optional mechanisms.

In some embodiments, the event-driven interface system 20 and the event-driven processor 30 are both in the first die 1-1.

In some embodiments, the event-driven sensor 10 and the event-driven interface system 20 are both in the second die 1-2.

In some embodiments, a part of the event-driven interface system 20 and the event-driven processor 30 are both in the first die 1-1 and the other part of the event-driven interface system 20 and the event-driven sensor 10 are both in the second die 1-2.

In an embodiment, the vias 42 comprises, but not limited to, through silicon vias (TSVs) or through glass vias (TGVs).

In some embodiments, the above-mentioned different dies are coupled by Cu—Cu technology.

In an embodiment, the interposer 40 comprises, but not limited to, a silicon interposer or a glass interposer.

Figure 4:
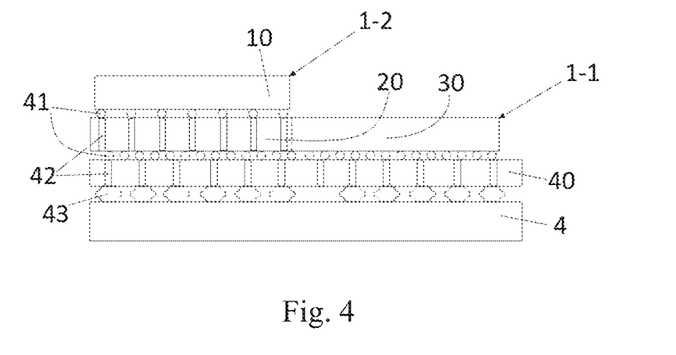
FIG. 4 is a diagram of a cross-section of a 3D chip according to an embodiment of the present disclosure.

FIG. 4 illustrates a cross section of a 3D chip according to an embodiment of the present disclosure. For example, the interface system 20 and the processor 30 are arranged in the first die 1-1 and the sensor 10 is arranged in the second die 1-2. It uses the interposer 40 to achieve the physical separation of the first circuit structure 1-1 and the second circuit structure 1-2.

For example, the C4 bumps 43 could be placed between the package substrate 4 and the interposer 40. The interposer 40 comprises multiple vias 42.

The μ bumps 41 are placed between the first die 1-1 and the interposer 40. The interface system 20 and the processor 30 are arranged in the same die, namely the first die 1-1. The interface system 20 is electrically connected to the processor 30 through the μ bumps 41 and/or vias 42. The interface system 20 in the first die 1-1 has vias 42 and is coupled to the sensor 10 in the second die 1-2 through the μ bumps 41. Thus, the second die 1-2 is stacked on the first die 1-1.

This 3D chip enormously reduces the occupied area of the chip, raises the information transmission efficiency among different components and reduces the power consumption of the system.

Specifically and Preferably, the technology nodes of the first die 1-1 and the second die 1-2 could be different. For example, the technology node of the second die 1-2 could be greater than 65 nm but the technology node of the interface system and the processor could be smaller than 65 nm, such as 22/14/10/7/5 nm. This allows the chip provider to select a combination of technology nodes with a better price-performance ratio in the manufacturing process of the chip. The present disclosure does not limit the combination of technology nodes.

Optionally, the processor 30 and the interface system 20 could be manufactured by the same technology node and manufactured in the same integrated circuit structure/die or different integrated circuit structures/dies.

Figure 5:
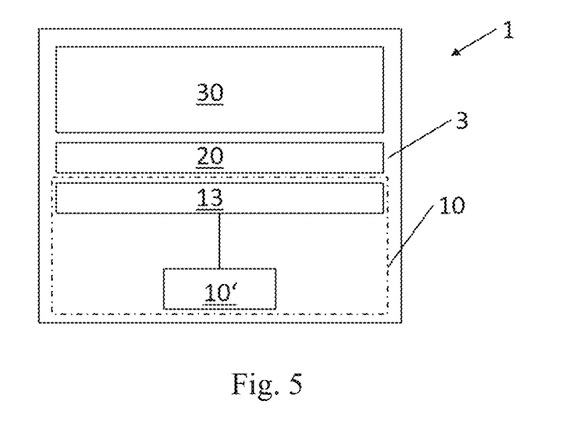
FIG. 5 is a circuit diagram of a sound/vibration sensor according to an embodiment of the present disclosure.

In an embodiment shown in FIG. 5, the system comprises a sound/vibration sensor 10', which is connected to the event-driven amplifier 13. The event-driven amplifier 13 is configured to amplify the signal of the sensor 10' and output an event 100 of variance of the intensity of sound/vibration power spectrum. Especially, the events are asynchronously generated according to each of the frequencies in the power spectrum. The amplifier 13 and the sound sensor 10' constitute the event-driven sensor 10. The amplifier 13 is connected to the interface system 20. The interface system 20 is configured to process the event(s) 100 generated by the amplifier 13 and transfers the processed event to the processor 30. In this embodiment, the sensor 10' and the amplifier 13 are placed in the same chip. This could achieve the advantages of the single chip structure.

In an embodiment, the event-driven sensor 10 is one or a combination of the following sensors: point sensor, 1D sensor and 2D sensor.

In an embodiment, the event-driven sensor is one or a combination of the following sensors: sound/vibration sensor and dynamic vision sensor.

Figure 6:
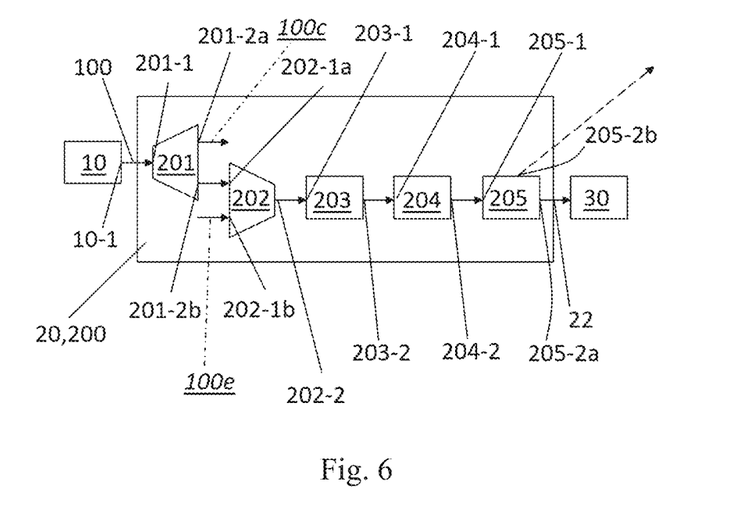
FIG. 6 is a flow chart showing the sensor generates the event according to an embodiment of the present disclosure.

FIG. 6 is a flow chart showing the sensor 10 in circuit system 1 generates the event(s) 100 according to an embodiment of the present disclosure. For example, it comprises a 2D sensor 10 of a series of pixels 11. Preprocessed event(s) 100 is/are achieved by the interface system 20. The interface system 20 preprocesses the event and outputs the processed event to the processor 30.

In this disclosure, the term "upstream" represents those close to the sensor side. The term "downstream" represents those close to the processor side. The two terms are related to the order to process the event. For example, in FIG. 6, the copy module 201 is at upstream of the event routing module 205.

In this figure, each block between the sensor 10 and the processor 30 represents a processing step. These processing steps are performed by the interface system 20. In order to achieve this purpose, the interface system 20 comprises a plurality of interface modules 200 (comprising but not limited to 201, 202, 203, 204, 205, 206, 207, 208 and 208'). The interface modules 200 could be independently programmable. Any one or more interface modules (200) can be bypassed by a programmable switch to support more network configurations. Preferably, the interface modules 200 could be specifically implemented as a hardware circuit and constitute programmable daisy chain. The daisy chain is configured to be event-driven and asynchronously process the event(s) 100 transferred from the sensor 10.

Copy module 201: In the embodiment shown in FIG. 6, the first interface module 201 is the copy module, which is placed after the sensor 10. The copy module 201 comprises an input end 201-1 coupled to the output end 10-1 of the sensor 10, a first output end 201-2a and a second output end 201-2b. The input end 201-1 of the copy module 201 is configured to receive an event(s) 100 and perform a copy operation. That is, the copy module 201 copies the received the event(s) 100 having an event address and transfers/forwards the copied event(s) 100c and copied event address to the first output end 201-2a of the copy module 201 and transfers/forwards the received event(s) 100 to the second output end 201-2b of the copy module 201 through the daisy chain.

The copied event(s) 100c could be fed to an external processing pipeline of a different system (not shown). The copy module 201 allows the event to be coupled to another system before any processing.

Merge module 202: In an embodiment, the merge module is coupled to the copy module 201. The first input end 202-1a of the merge module 202 is coupled to the second output end 201-1b of the copy module 201. The merge module 202 further comprises a second input end 202-1b configured to receive the event(s) 100e from other parts/components. These parts/components could be in the circuit system itself or some other circuit systems (not shown), such as the event(s) outputted from the second sensor or daisy chain. The merge module 202 further comprises an output end 202-2, configured to forward all received events 100 and/or events 100e through the daisy chain. After this, the event(s) 100e is/are merged in a stream constituted by the event(s) 100. Therefore, after this, there is no need to distinguish the event 100e and the event 100 and these events will be described as the event(s) 100. This embodiment is allowed to integrate more parts and/or information during the process of the circuit system and thus has a more flexible system configuration.

Sub-sampling (i.e., sum pooling) module 203: The output end 202-2 of the merge module 202 is coupled to the input end 203-1 of the sub-sampling module 203. The sub-sampling module 203 is configured to assign a single address to the received event(s) 100. In this way, it could reduce the number of different event addresses. Through this method, for example, it represents that certain event addresses corresponding to certain different pixels of the 2D matrix sensor 10 could be sub-sampled to form fewer pixels. The sub-sampling is called as binning in certain applications.

The sub-sampling module 203 could be bypassed by programmable switch.

Region of interest (ROI) module 204: The output end 203-2 of the sub-sampling/sum pooling module 203 is coupled to the input end 204-1 of the ROI module 204. The ROI module 204 is configured to adjust the property of at least one event address. Specifically, the adjustment could be done by shifting, flipping, swapping and/or rotating the property of at least one event address. The operation performed within the ROI module could be a rewriting operation to the event address. In addition, the ROI module 204 could be further configured to discard those events having properties that are outside of a range of programmable event address properties. The ROI module 204 is programmable. The range of programmable event address properties is set according to each of the event address properties. In addition, the ROI module 204 is further configured to forward the received event(s) 100 as long as the event(s) 100 is/are not discarded along with the adjusted address to the next stage through the daisy chain.

In some embodiments, taking the 2D image as an example, the ROI module 204 is allowed to crop the image and/or perform any geometric operation on the event(s) 100 based on the pixel coordinates.

Event routing module 205: The input end 205-1 of the event routing module 205 is coupled to the output end 204-2 of the ROI module 204 to receive the event(s) 100. The event routing module 205 is configured to optionally associate header information in its received event(s) 100 and output the event(s) 100 along with the header information to the first output end 205-2a. Optionally, the event routing module 205 is configured to copy the adjusted event(s) 100 with the header information and output the adjusted event(s) 100 with the copied header information to the second output end 205-2b. The second output end 205-2b could be coupled to other event-driven processor or other processing pipelines.

With such configuration, the event routing module 205 provides the following capabilities to the circuit system 1: providing pre-processed information from the events to any kind of processor or program running in processor for processing the events.

The first output end 205-2a of the event routing module 205 is coupled to the processor 30. The processed event(s) 100 with the event address and the header information is/are then forwarded to the processor 30 and will then be processed, such as pattern or characteristic identification tasks or other applications.

Optionally, the circuit system 1 could further comprise other interface modules 200. These interface modules 200 could be configured to receive the event(s) 100 from the sensor 10 or similar places to perform tasks, such as a rate limiting task, a hot pixel filtering task, and/or an event address overwrite task (referring to FIGS. 8-9).

Rate limit module: The rate limit module is configured to limit the rate of the events not to be greater than a maximum rate. For example, this can limit the rate of the events having the same event address. After the rate is greater than the maximum rate, a fraction of the events are transferred through the daisy chain. For example, every $n^{th}$ event will not be transferred through the daisy chain. Here, the number n is a value determined according to the current event rate. The maximum rate could be programmable, adjustable, and stored in a storage device. The storage device could be a part of the rate limit module or an external device. The rate limit module could comprise or be connected to a processing unit having a clock for determining the event receiving rate of the rate limit module. In this way, the event rate through the daisy chain will not be greater than the maximum rate and thus the data rate feeding into the processor 30 is also limited.

Each of the interface modules 200 is programmable. Therefore, an appropriate instruction could be issued to bypass the interface module 200. For example, if it's not necessary to flip the coordinates, the entire ROI module 204 could be bypassed to directly connect the sub-sampling/sum pooling module 203 to the event routing module 205.

Figure 7:
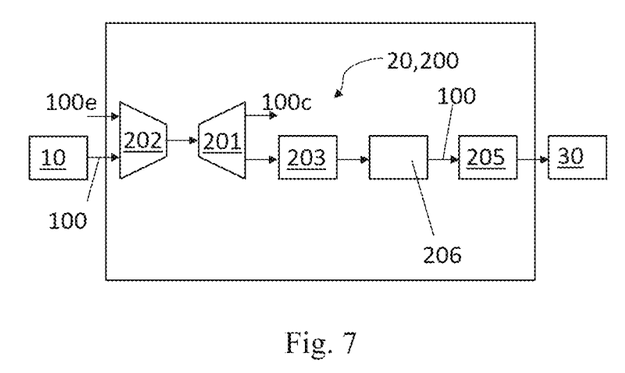
FIG. 7 is a flow chart showing the sound sensor records vibrations according to an embodiment of the present disclosure.

FIG. 7 illustrates that the sensor comprises a sound sensor for recording vibrations according to an embodiment of the present disclosure. Here, the sensor comprises an amplifier (referring to FIG. 5) and a filter. The sensor is configured to generate events from the sound sensor and asynchronously encodes the events 100 according to the recorded power spectrum. Furthermore, the amplifier is configured to shift a channel. As a combination, the sound sensor and the amplifier can be regarded as an event-driven sensor 10.

As previously mentioned, the event-driven sensor 10 forwards the event(s) 100 to the merge module 202. The event(s) 100e is/are forwarded from another processing pipeline and merged with the event(s) 100 generated by the event-driven sensor 10. In addition, as previously mentioned, the merged event(s) 100 is/are then forwarded to the copy module 201 and thus copied. The copied event(s) 100c is/are then forwarded to the same processing pipeline, which could be the source of the event(s) 100e or any other processing pipeline (not shown). This permits a huge flexibility when the daisy chain is being designed or processed. It could be understood that, in this embodiment, many events 100 and 100e might be forwarded into the daisy chain at an early stage. The advantage of having programmable modules in the interface system 20 of the daisy chain comprises: it could have a common event format and/or event address format in the processor 30 such that the event(s) 100 could processed and the processor could perform its preset functions without further adjustments.

The cooperation of the copy module 201 and the merge module, especially at the early stage of the processing, significantly increases the system interoperability.

Mapping module 206: The mapping module 206 could be placed between the sub-sampling/sum pooling module 203, which is for pooling, and the event routing module 205, which is for routing the events (referring to FIG. 6). The mapping module 206 and the ROI module 204 are placed between the sub-sampling/sum pooling module 203 and the event routing module 205 for achieving the abundant event address mapping operations.

According to an embodiment, a certain interface module is/comprises a mapping module (such as the above-mentioned mapping module 206). The mapping module 206 is configured to map an event address to another event address. The mapping module 206 comprises one or a combination of the following elements:
1. ROI module 204;
2. Look up table (LUT) module;
3. Flipping and/or rotating module, configured to flip and/or rotate the event address of the event.

Preferably, all the interface modules (including those that will be disclosed later) could be bypassed by programmable switches.

Figure 8:
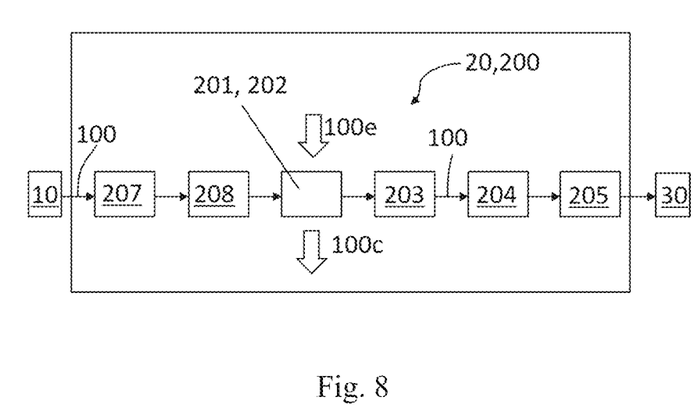
FIG. 8 is a diagram of a daisy chain of an interface system according to an embodiment of the present disclosure.

FIG. 8 illustrates a daisy chain achieved by programmable interface modules 200, which are integrated in the interface system 20.

Event address rewrite module 207: The event-driven sensor 10 provides a stream of events 100, which is forwarded to the event address rewrite module 207 optionally. The event address rewrite module 207 is configured to rewrite the event format to be the common format for the following processing steps. That is, the event address rewrite module 207 converts the event address of the events received from the sensor into a common address format. In this way, the events with a common event address format are transferred through the daisy chain. The event address rewrite module 207 could be programmable based on a certain type of sensor. The purpose is for adopting any type of sensor 10 that actually provides any type of event address. The event format could be related to byte-order and the event address format of stored generated event. The common event address is a predetermined data format. This allows the following processing to rely on the predetermined data format and thus could omit the double check on the event address format and achieve a faster processing.

Event address filter module 208: Once the event address rewrite module 207 completes the common event and event address formatting, the event is further processed by the event address filter module 208. The selected event address could be stored, read, written in a content-addressable memory (CAM). The filter could filter out the hot pixels or similar. Therefore, the event address filter module 208 could be a hot pixel filter module. After the event address rewrite module 207, the event address filter module 208 is the first following module or a part of it. It could reduce the number of events transferring through the daisy chain at an early state. This process could reduce the power consumption of the daisy chain. If the processor 30 also has the capability of filtering out the addresses, the event address rewrite module 207 could be bypassed.

The filtered events 100 will be forwarded to the copy module 201 and/or merge module 202. These two modules could respectively provide the copied event(s) 100c to the external system and merge the event(s) 100e received from the external system. The copy module 201 and the merge module 202 could be independently programmed to be bypassed.

In an embodiment, the copy module 201 and the merge module 202 could exist but there is no certain order of these modules. The copy module 201 could process first and the merge module 202 then processes, or vice versa. The details had been illustrated previously with regard to FIGS. 6-7.

After the copy module 201 and the merge module 202, the sub-sampling/sum pooling module 203 processes the received event according to the above embodiments. By placing the sub-sampling/sum pooling module 203 at a certain position in the daisy chain, it could process all events even if the events are from an external system.

The ROI module 204 follows the sub-sampling/sum pooling module 203 and processes the events forwarded by the sub-sampling/sum pooling module 203. The ROI module 204 reduces the number of events address and thus reduces the work loads. The ROI module could also be configured to flip and/or rotate the X and Y coordinates of the event address.

The event routing module 205 follows the ROI module 204. The event routing module 205 is configured to prepare the event, such as provide the header information of the event(s) 100. The event(s) 100 is then forwarded to the processor 30.

FIG. 8 illustrates a daisy chain, which provides a common processing method for efficiently and flexibly handling the events from the sensor 10 or other sources.

Figure 9:
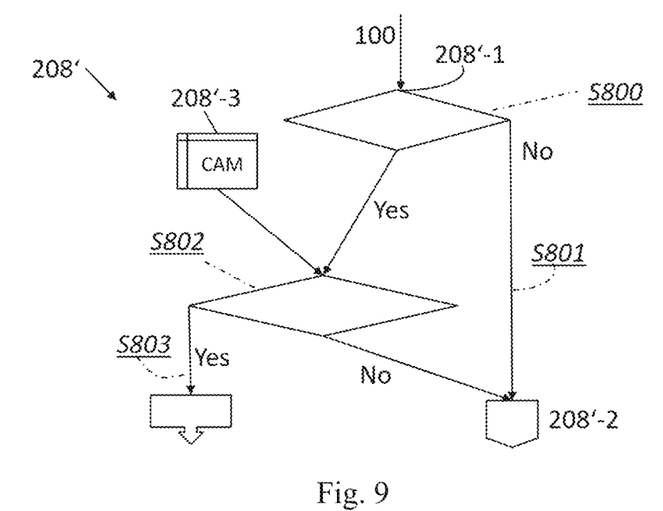
FIG. 9 is a diagram of a hot pixel filter module capable of filtering out an event having a specific event address according to an embodiment of the present disclosure.

Hot pixel filter module 208': FIG. 9 illustrates a hot pixel filter module 208', which is an embodiment of the event address filter module 208. The function of the hot pixel filter module 208' is to filter out the certain events having a specific event address. For example, this could allow reduce the number of certain events or eliminate all the certain events from the daisy chain. These events are eliminated because of the input device (such as the pixels of the 2D matrix sensor are compromised or damaged). The hot pixel filter module 208' comprises an input end 208'-1 for receiving the event(s) 100.

After receiving the event(s) 100, a hot pixel filter enablement determination step S800 is performed. If it is determined in the step S800 that the hot pixel filter is disabled, then the hot pixel filter module 208' could be programmed to be bypassed such that the event 100 is directly forwarded to the output end 208'-2 of the hot pixel filter module 208 in step S801. If it is determined in the step S800 that the hot pixel filter function is enabled, preferably, the predetermined event address list to be filtered out is read from the CAM 208'-3. In an address comparison/matching step S802, the address of the event(s) 100 is/are verified to see if the address belongs to one of the predetermined event addresses to be filtered out. If yes, then the event(s) 100 will be filtered out from the daisy chain and dropped in step S803. If not, then the event(s) 100 will be outputted to the pipeline from the output end 208'-2 of the hot pixel filter module 208'.

Figure 10:
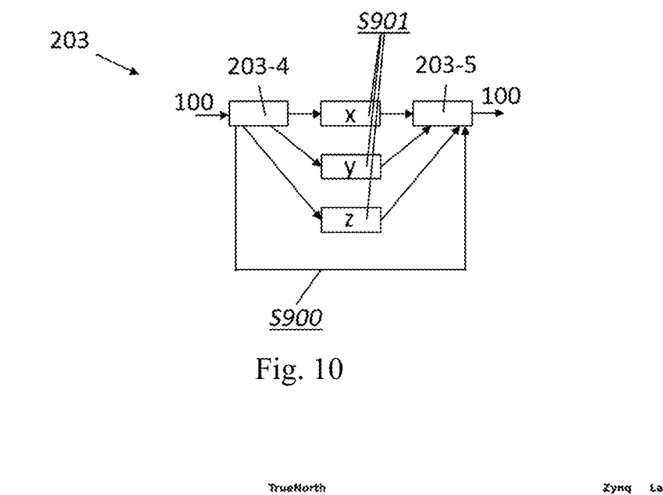
FIG. 10 is a diagram of a sub-sampling module according to an embodiment of the present disclosure.

FIG. 10 illustrates a diagram of the sub-sampling/sum pooling module 203 according to an embodiment of the present disclosure. The inputted event(s) 100 is/are processed by assessing its related address, especially its coordinates (such as x, y, z coordinates).

For example, the address of the event(s) 100 is/are divided into three different addresses by the division module 203-4. After the above-mentioned coordinates (x, y, z) is shifted or divided in step S901, the x, y, z coordinates are sub-sampled to a coordinate set of a low data amount. This effectively reduces the number of pixel coordinates. The processed event addresses are merged by the address reassemble module 203-5. Then, the processed address and the event 100 are forwarded to the next stage for further processing.

Specifically, the division module 203-4 is configured to route the event(s) 100 to the correlated scaling register of sub-sampling/sum pooling module 203 according to the address (such as x, y, z coordinates) of the received event. The scaling register is configured to divide, sub-sample, pool, and/or shift the received address and outputs the address to the address reassemble module 203-5 of the sub-sampling/sum pooling module 203. The address reassemble module 203-5 is configured to adjust the event address according to the scaled address and forward the event with the adjusted address through the daisy chain.

For example, through pooling the event addresses of adjacent input devices, the sub-sampling/sum pooling module 203 could adjust the pixel resolution of the 2D matrix sensor. Thus, the numbers of pixels on the X and Y axes are reduced. For instance, the resolution of the images to be processed by processor could be from 256*256 to 64*64. For the 1D sensor, the sub-sampling/sum pooling module 203 could be also included to do a similar processing.

In some embodiments, the event(s) 100 may further comprise a channel identifier, which will not be divided. Instead, such event(s) 100 will loop through the sub-sampling/sum pooling module 203 in Step S900.

3. Statement for the Design Around

The present disclosure has been described according to the features and embodiments. These embodiments could be modified or combined, and these modifications still fall within the scope of the present disclosure. Therefore, the specification and the figures should be simply regarded as the illustration for some embodiments of the present disclosure and cover all modifications, changes, combinations and equivalents falling within the scope of the present disclosure. Thus, although the advantages and the present disclosure have been illustrated in detail, they could be modified or combined and these modifications still fall within the scope of the present disclosure. In addition, the scope of the present disclosure is not limited to the process, machine, manufacturing, constituted machine, devices, methods, or steps of the embodiments.

A person having ordinary skills in the art would easily understand, based on the teaching and embodiments of the present disclosure, the currently-existed or later-developed processes, machines, manufacturing, constituted materials, devices, methods, or steps that could substantially achieve the same functions or results. Accordingly, the claims should cover such processes, machines, manufacturing, constituted materials, devices, methods, or steps.

In order to have better performance or to meet specific needs, a person having ordinary skills in the art would modify the techniques based on the teaching of the present disclosure. However, even if the modification/design has its inventiveness, as long as the modification utilizes the technical feature covered by the claims of the present disclosure, the modification also falls within the scope of the present disclosure according to the "all element rule".

A specific technical feature in the claims may have its alternative. Or the order of the process or the composition of the material could be rearranged. However, a person having ordinary skills in the art may easily understand these alternatives or the rearranged order based on the teaching of the present disclosure to solve the same issue or achieve the same technical results. Therefore, even if the claims recite the above technical feature and/or the order, these changes, modifications, alternatives should also fall within the scope of the present disclosure based on the doctrine of equivalents.

Those numbers specified in the claims, such as 1.5 Volts, should not be understood that the voltage level needs to be exactly 1.5 Volts. Normally, a person having ordinary skills in the art could understand that 1.2V or 1.8V could be also used in some embodiments. These design-around proposals should also fall within the scope of the claims.

The method steps or units disclosed in the embodiments could be implemented by hardware, software or their combination. In order to clearly illustrate the interchangeability between the software and the hardware, the steps and composition of the embodiments have been described according to their functions. As to whether these functions are performed by the hardware or the software, it depends on the application and design demands. A person having ordinary skills in the art could have different implementations to achieve the described functions according to specific applications. These implementations fall within the scope of the claims.

Furthermore, the exemplary modules, components, or equipments for executing instructions could comprise a non-volatile computer/processor readable storage medium for storing instructions, such as computer/processor readable instructions, data structures, program modules and/or other data. This non-volatile computer/processor readable storage medium could be regarded as a part of the equipment or an accessible or connectable equipment. In the present disclosure, any application or module could be implemented by the computer/processor readable/executable instructions, which could be stored in the non-volatile computer/processor readable medium.

TABLE 1

List of labels in the drawings of the present disclosure

| 1 | Event-driven integrated circuit system | 200 | Interface module | 206 | Mapping module |
|---|---|---|---|---|---|
| 1-1 | First die | 201 | Copy module | 207 | Event address rewrite module |
| 1-2 | Second die | 201-1 | Input end of copy module 201 | 208 | Event address filter module |
| 3 | Chip | 201-2a | First output end of copy module 201 | 208' | Hot pixel filter module |
| 4 | Packaging substrate | 201-2b | Second output end of copy module 201 | 208'-1 | Input end of hot pixel filter module 208' |
| 10 | Event-driven sensor | 202 | Merge module | 208'-2 | Output end of hot pixel filter module 208' |
| 10-1 | Output of event-driven sensor 10 | 202-1a | First input end of merge module 202 | 208'-3 | CAM |
| 10' | Sound/vibration sensor | 202-1b | Second input end of merge module 202 | S800 | Hot pixel filter enablement determination |
| 11 | Event-driven input device/pixel | 202-2 | Output of merge module 202 | S801 | Event forwarded step |
| 12 | Output end of sensor | 203 | Sub-sampling module | S802 | Address comparison/matching step |
| 13 | Event-driven Amplifier | 203-1 | Input end of sub-sampling module 203 | S803 | Filtered out step |
| 20 | Event-driven interface system | 203-2 | Output end of sub-sampling module 203 | 203-4 | Division module |
| 21 | Input of interface system | 204 | ROI module | 203-5 | Address reassemble module |
| 21-1 & 21-2 | Input ends of interface system | 204-1 | Input end of ROI module 204 | S900 | Loop through step |
| 22 | Output end of interface system | 204-2 | Output end of ROI module 204 | S901 | Shifted or divided step |
| 22-1 & 22-2 | Output ends of interface system | 205 | Event routing module | | |
| 30 | Processor | 205-1 | Input end of event routing module 205 | | |
| 40 | Interposer | 205-2a | First output end of event routing module 205 | | |
| 41 | μ bump | 205-2b | Second output end of event routing module 205 | | |

TABLE 1-continued

List of labels in the drawings of the present disclosure

| 42 | Via | | |
|---|---|---|---|
| 43 | C4 bump | 100c | Copied event(s) |
| | Event(s) | 101 | Preprocessed event(s) |

Note:
The annotated label is quoted in the comment column. For example, 10-1 indicates the output end of the event-driven sensor.

What is claimed is:

1. An integrated circuit for event sensing and processing, comprising: an event-driven sensor, an event-driven interface system and an event-driven processor, wherein:

the event-driven sensor, the event-driven interface system and the event-driven processor are coupled to a single chip;

the event-driven processor comprises a spiking neural network;

the event-driven interface system comprises at least one interface module, the interface module constitutes a programmable daisy chain and asynchronously processes the event received from the event-driven sensor;

the event-driven sensor is configured to: after an input device of the event-driven sensor detects an event generation signal and/or a change of the event generation signal, asynchronously generate and output an event, wherein the event comprises an event address that is either correlated to or identical with the event address of the input device, an output end of the event-driven sensor is coupled to an input end of the event-driven interface system;

the event-driven interface system is configured to: asynchronously receive the event and preprocess the received event, an output end of the event-driven interface system is coupled to an input end of the event-driven processor;

the event-driven processor is configured to: receive the preprocessed event from the event-driven interface system and asynchronously process the preprocessed event; and the event-driven sensor, the event-driven interface system and the event-driven processor are coupled to the single chip through an interposer;

the interface module comprises one or more the following modules: copy module, merge module, sub-sampling module, ROI module and event routing module wherein:

the copy module is configured to: receive the events, perform a copy operation to obtain copied events and transfer the copied events to an external processing pipeline and transfer the events through the programmable daisy chain wherein the events are from the event-driven sensor or another interface module of the event-driven interface system;

the merge module is configured to receive events from two different sources at least, and transfer a part or all of the events to the downstream interface module through the programmable daisy chain, wherein the events are from the event-driven sensor or another interface module of the event-driven interface system and the events are also from the integrated circuit, a part/module from another integrated circuit or another event-driven sensor;

the sub-sampling module is configured to assign a single address to its received events;

the region of interest (ROI) module is configured to adjust a property of at least one event address and/or to discard events having properties outside of a range of programmable event address properties and transfer the non-discarded events through the programmable daisy chain, wherein the ROI module adjusts the event address by one or combination of shifting, flipping, swapping and/or rotating the property of the at least one event address;

the event routing module is configured to receive events, add header information to the received events, and output the events along with the header information to the event-driven processor and/or another event-driven processor or another processing pipeline;

the sub-sampling module comprises a division module, configured to route the event to a correlated scaling register of sub-sampling module according to the address of the received event; the scaling register is configured to divide, sub-sample, pool, and/or shift the received address and output the address to a address reassemble module of the sub-sampling module; wherein the address reassemble module is configured to adjust the event address according to a scaled address and forward the event with the adjusted address through the programmable daisy chain.

2. The integrated circuit for event sensing and processing of claim of 1, wherein:
the event-driven interface system and the event-driven processor are both located in a first die; or the event-driven sensor and the event-driven processor are both located in a second die; or a part of the event-driven interface system and the event-driven processor are both located in the first die and another part of the event-driven interface system and the event-driven sensor are located in the second die.

3. The integrated circuit for event sensing and processing of claim 2 wherein:
the first die and the second die are manufactured by different technology nodes.

4. The integrated circuit for event sensing and processing of claim 1, wherein:
the event-driven interface system and the event-driven processor are both located in a first die; and a second die where the event-driven sensor is located is stacked on the first die.

5. The integrated circuit for event sensing and processing of claim 1, wherein: the interposer is a silicon interposer or a glass interposer.

6. The integrated circuit for event sensing and processing of claim 1, wherein:
the event-driven sensor, the event-driven interface system and the event-driven processor are packaged on the single chip through a 2.5D or 3D packaging technique.

7. The integrated circuit for event sensing and processing of claim 1, wherein:
the interface module further comprises one or more of the following modules: event address rewrite module, event address filter module, mapping module, and rate limit module wherein
the event address rewrite module is configured to convert the event address into a common address format such that the events with the common address format are transferred through the programmable daisy chain;
the event address filter module is configured to filter out a series of events having a preselected event address;

the mapping module is configured to map an event address to another event address;
the rate limit module is configured to forward a part of the event through the programmable daisy chain when the rate of the events is greater than a maximum rate in order to limit the rate of the events not to be greater than the maximum rate.

8. The integrated circuit for event sensing and processing of claim 7, wherein:
the mapping module comprises one or a combination of an ROI module, a look up table module, a flipping and/or rotating module; wherein the flipping and/or rotating module is configured to flip and/or rotate the event address of the event.

9. The integrated circuit for event sensing and processing of claim 7 wherein:
the event address filter module is a hot pixel filter module, configured to filter out the certain events having a specific event address and use a CAM storage device to store an event address list to be filtered.

10. The integrated circuit for event sensing and processing of claim 1 wherein:
at least one interface module of the event-driven interface system can be bypassed by a programmable switch.

11. An event-driven interface system in an integrated circuit for event sensing and processing, coupled to an event-driven sensor and an event-driven processor to form an integrated circuit, the event-driven sensor generating and asynchronously outputting an event wherein the event comprises an event address that is either correlated to or identical with the event address of an input device, wherein:
the event-driven interface system comprises at least one interface module, wherein the at least one interface module constitutes a programmable daisy chain and asynchronously processes the event received from the event-driven sensor;
the event-driven sensor, the event-driven interface system, and the event-driven processor are coupled to a single chip through an interposer or manufactured in a same die;
wherein the at least one interface module comprises one or more of a copy module, a merge module, a sub-sampling module, an ROI module and an event routing module;
wherein the copy module is configured to: receive events, perform a copy operation to obtain copied events, transfer the copied event to an external processing pipeline, and transfer the events through the programmable daisy chain, wherein the events are from the event-driven sensor or another interface module of the event-driven interface system;
wherein the merge module is configured to receive the events from two different sources at least, and transfer a part or all of the events to the downstream interface module through the programmable daisy chain, wherein the events are from the event-driven sensor or another interface module of the event-driven interface system, and the events are also from the integrated circuit, a part/module from another integrated circuit or another event-driven sensor;
wherein the sub-sampling module is configured to assign a single address to the received events;
wherein the region of interest (ROI) module is configured to adjust a property of at least one event address and/or to discard events having properties outside of a range of programmable event address properties and transfer the non-discarded events through the programmable daisy chain, wherein the ROI module adjusts the event address by one or combination of shifting, flipping, swapping and/or rotating the property of the at least one event address;

wherein the event routing module is configured to receive the events, add header information to the received events, and output the events along with the header information to the event-driven processor and/or another event-driven processor or another processing pipeline;

wherein the interface module has a following coupling order along a data transmission direction of the programmable daisy chain:

the copy module, the merge module, the sub-sampling module, the region of interest (ROI) module, and the event routing module; or the merge module, the copy module, the sub-sampling module, the region of interest (ROI) module, and the event routing module.

12. The event-driven interface system in an integrated circuit for event sensing and processing of claim 11, wherein:

the interface module further comprises one or more of the following modules: an event address rewrite module, event address filter module, mapping module, and rate limit module wherein the event address rewrite module is configured to convert the event address into a common address format such that the events with the common address format are transferred through the programmable daisy chain;

the event address filter module is configured to filter out a series of events having a preselected event address;

the mapping module is configured to map an event address to another event address;

the rate limit module, configured to forward a part of the events through the programmable daisy chain when the rate of the events is greater than a maximum rate to limit the rate of the events not to be greater than the maximum rate.

13. The event-driven interface system in an integrated circuit for event sensing and processing of claim 11, wherein:

at least one interface module of the event-driven interface system is bypassed by a programmable switch.

14. An event-driven interface system in an integrated circuit for event sensing and processing, coupled to an event-driven sensor and an event-driven processor to form an integrated circuit, the event-driven sensor generating and asynchronously outputting an event wherein the event comprises an event address that is either correlated to or identical with the event address of an input device, wherein:

the event-driven interface system comprises at least one interface module the interface module constitutes a programmable daisy chain and asynchronously processes the event received from the event-driven sensor; and wherein the at least one interface module of the event-driven interface system is bypassed by a programmable switch.

* * * * *